June 11, 1929.   R. L. GOW   1,716,631
SNARE
Filed July 20. 1927
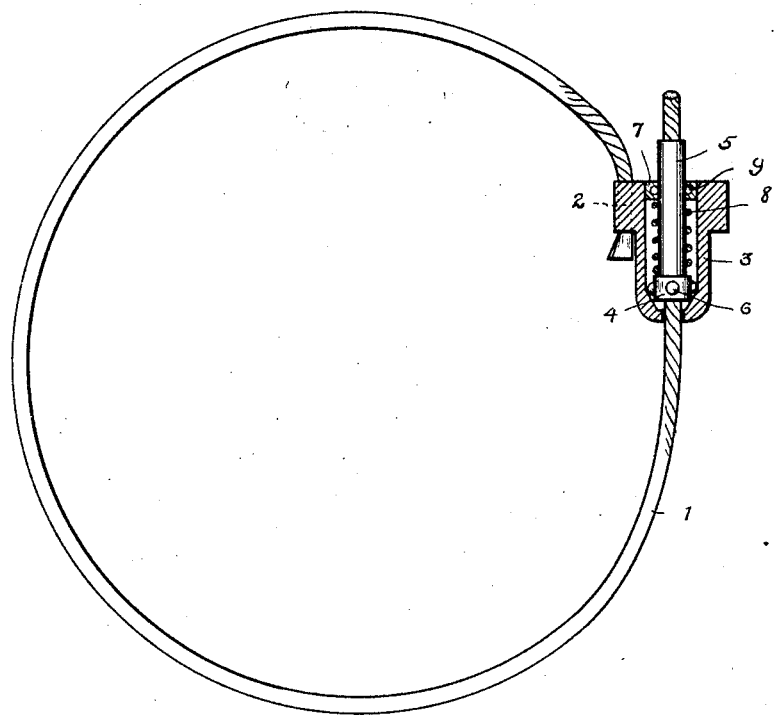
Inventor
Robert L. Gow.
By Geo. Stevens.
Attorney Patented June 11, 1929.

1,716,631

UNITED STATES PATENT OFFICE.

ROBERT L. GOW, OF HIBBING, MINNESOTA.

SNARE.

Application filed July 20, 1927. Serial No. 207,140.

This invention relates to snares for catching animals, the principal object being to provide a device of this character more efficient and practical than heretofore known.

Another object is to provide a catch for a snare free from any possibility of slipping, and one that will take up and hold the least fraction of tightening stress upon the loop of the snare, thus resulting in a quicker killing snare and more humane means of catching wild animals.

Other objects and advantages of the invention will appear in the further description thereof.

In the accompanying drawing forming part of this application, and in which like reference characters indicate like parts, the illustration represents the loop of a snare with the improved catch attached thereto, the latter being shown partly in section and partly in elevation.

1 represents the loop or noose of a snare, made preferably of twisted wire, one end of which is attached as at 2 to the annular enlargement or flange of the body 3 of the catch, and the snare wire is roven through the lowermost end of the body 3 of the catch and the ball cage 4 mounted within said body portion. This cage has an elongated extension 5 thereupon which protrudes beyond the opposite end of the body 3 and through which the snare wire also extends. The ball cage 4 is a simple annular ring having four circumferentially spaced holes therein in which are mounted the balls 6 which are in constant engagement with the snare wire as well as the inner walls of the body 3.

Intermediate of the upper extremity of the ball cage and the friction washer 7 is installed an expansive spiral spring indicated at 8 which normally tends to hold the ball race in gripping position in the lower extremity of the body 3 so that the least tightening of the loop which causes the snare wire to traverse the catch longitudinally, or as shown in the drawing, upwardly, will be there firmly held by the impinging effect of the balls, the instant opposite stress is applied to the wire; the lowermost end of the body portion 3 being suitably constricted for such purpose. However, when it is desired to slacken the noose or loop all that is necessary is to pull outwardly upon the protruding end of the extension 5 of the ball cage, thus counteracting the effect of the spring 8 and releasing the gripping effect of the balls.

The friction collar 7 is simply seated into the body 3 by frictional contact therewith as there is at no time any considerable stress upon same.

I prefer to mount within the friction washer 7 a plurality of anti-friction balls 9 for direct engagement with the extension 5 of the cage so that the extension may move therein as freely as possible which makes positive the action of the catch upon the least movement of the snare wire.

From the foregoing it is evident that I have devised a simple and efficient wire catch, permitting of the wire freely paying through the catch in one direction and positively holding against any movement in the opposite direction, the same being particularly adapted for use as a snare or other form of loop or bight.

Having thus described my invention, what I claim and desire to secure by Letters Patent, is:

A snare catch of the character described comprising a hollow cylindrical body portion having an annular enlargement about one end thereof, there being a hole through the enlargement externally of the body portion and in axial alignment therewith, a snare wire passing axially through the body portion and having its extreme end permanently fixed within the hole in the enlargement, means within the catch for holding the wire against a stress having a tendency to enlarge the noose, and means extending beyond the body portion and surrounding the wire for manually releasing said holding means.

In testimony whereof I affix my signature.

ROBERT. L. GOW.